United States Patent Office 3,427,177
Patented Feb. 11, 1969

3,427,177
SECONDARY PLASTICIZER FOR THERMO-
PLASTIC NON-RUBBERY POLYMERS
Maurice K. Rausch, South Holland, and Henry V. Isaacson, Oak Forest, Ill., assignors to Sinclair Research, Inc., New York, N.Y., a corporation of Delaware
No Drawing. Filed Oct. 21, 1965, Ser. No. 500,348
U.S. Cl. 106—191                           15 Claims
Int. Cl. C08f 45/52; C08b 27/60

ABSTRACT OF THE DISCLOSURE

A secondary plasticizing agent for use with thermoplastic, non-rubbery polymers, preferably in combination with a primary plasticizer, which is the product produced by the process comprising hydrogenating a petroleum naphthenic lubricating oil fraction by contact with molecular hydrogen and a sulfur-resistant hydrogenation catalyst at a temperature of about 400 to 800° F. and a pressure of about 300 to 5,000 p.s.i.g. to provide a hydrogenated oil and hydrogenating said hydrogenated oil by contact with molecular hydrogen in the presence of a platinum group metal hydrogenation catalyst at a temperature of about 400 to 800° F. and a pressure of about 300 to 5,000 p.s.i.g., to provide a product having an aromatic content of less than about 3%.

---

This invention relates to the production of improved secondary plasticizers useful in the processing of thermoplastic, non-rubbery resins such as polyvinyl chloride and to resinous compositions incorporating such improved secondary plasticizers which resinous compositions have improved properties such as color stability upon aging, etc.

Primary plasticizers which are highly compatible with resins, e.g., on the order of about 150 parts per hundred parts of the resin, are widely utilized in production of plastic resins such as polyvinyl chloride and ethyl cellulose. Typical primary plasticizers are esters of alcohols having about 8 to 10 carbon atoms and acid compounds such as phthalic anhydride, phosphorous chloride, sebacic acid, azelaic acid, adipic acid, fatty acids, etc. Mono and polyhydric alcohols are suitable. Examples of primary plasticizers are dioctyl phthalate, dibutyl phthalate, tricresyl phosphate, dioctyl adipate, dioctyl sebacate, triisooctyl trimellitate, and di-2-ethyl hexyl azelate.

In addition to primary plasticizers, secondary plasticizers are also used with plastic resins. Secondary plasticizers differ from primary plasticizers in that the former have limited compatibility with the resins but are desirable, for example, to extend the primary plasticizers and/or to impart certain desired properties to the end products. Although secondary plasticizers have limited compatibility with the resin, this compatibility should be sufficient so that the plasticizer will not migrate to the surface of articles produced from the resin. Also, secondary plasticizers must have low volatility so that plasticizer is not lost from the resin during its processing, and, additionally, secondary plasticizers should not cause discoloration of light colored articles produced from the resin, nor cause migration staining of materials or surfaces in contact with the resin. This invention is directed to the production of secondary plasticizers possessing such desirable properties including low volatility and excellent light and color stability as well as good compatibility and processing characteristics.

In general, the secondary plasticizers of this invention are produced by a two-step hydrogenation process using definite catalyst types in each stage and select type feedstocks. In accordance with this invention a lubricating oil fraction derived from distillation of naphthenic base petroleum crude oil is first hydrogenated over a sulfur-resistant hydrogenation catalyst, e.g., a nickel or cobalt-molybdenum type catalyst, for substantial desulfurization, denitrogenation, and partial aromatic saturation. The product of this hydrogenation is then hydrogenated over a platinum group metal catalyst such as platinum for essentially complete aromatic saturation. The dual hydrogenation operation of this process are conducted to reduce the aromatic carbon content of the initial naphthenic lubricating oil feed to less than about 3%. The first hydrogenation usually accomplishes about 40 to 70% aromatic reduction and the second hydrogenation about 30 to 60% reduction for essentially complete aromatic saturation.

The petroleum lubricating oil fractions, i.e., distillate oils derived from naphthenic base crudes, e.g., Gulf Coast and California crudes, which are used to produce the secondary plasticizers of this invention generally contain about 10 to 25% aromatics and less than about 65%, preferably less than about 50%, paraffins with the essential balanced being naphthenes. Such oils, if they contain a wax, are, preferably, dewaxed prior to the first hydrogenation operation although the dewaxing can follow the first hydrogenation operation. The dewaxing can be carried out for example by solvent dewaxing using methyl ethyl ketone and toluene as the solvent to achieve oil of below 25° F. pour point (ASTM D 97). The pour point after dewaxing is determined by that required in the finished product.

The catalyst of the first hydrogenation operation can be the various sulfur-resistant catalysts conventionally employed in the hydrogenation of heavy petroleum oils. Examples of suitable catalytic ingredients are members of Group VI–B in the Periodic Table, i.e., chromium, molybdenum and tungsten and metals of Group VIII, i.e., cobalt and nickel. Generally these metals are supported, e.g., on conventional catalyst supports such as alumina, and are present in catalytically effective amounts, for instance about 2 to 30 weight percent, in the form of the oxides or sulfides thereof. Mixtures of these materials or compounds of two or more of the oxides or sulfides can be employed, for example, mixtures or compounds of the Group VIII metal oxides or sulfides with the oxides or sulfides of Group VI–B constitute very satisfactory catalysts. Examples of such mixtures or compounds are nickel molybdate, tungstate or chromate (or thiomolybdate, thiotungstate or thiochromate) or mixtures of nickel and/or cobalt oxides with molybdenum, tungsten or chromium oxides. As the art is aware, these catalytic ingredients are generally employed while disposed upon a suitable carrier of the solid oxide refractory type, e.g., a predominantly calcined or activated alumina. Commonly employed catalysts have about 1 to 10% of a Group VIII metal and 5 to 25% of a Group VI–B metal (calculated as the oxide). Advantageously, the catalyst is cobalt molybdate supported on alumina. Such preferred catalysts can be prepared by the method described in U.S. Patent 2,938,002 issued May 24, 1960 to Carl D. Keith et al.

The first stage hydrogenation of the instant process is generally conducted at a temperature of about 400 to 800° F., preferably about 600 to 750° F. Other reaction conditions generally include pressures of about 300 to 5,000 p.s.i.g., preferably about 500 to 2,500 p.s.i.g.; weight hourly space velocities (WHSV) of about 0.1 to 5, preferably about 0.2 to 2; and molecular hydrogen to oil ratios of about 500 to 2,500 standard cubic feet of hydrogen per barrel of oil (s.c.f./b.).

Following the first hydrogenation stage, the hydrogenated oil is subjected to a second hydrogenation operation which involves contacting the initially hydrogenated oil in the presence of hydrogen with a platinum group metal-promoted hydrogenation catalyst at a temperature of about 400 to 800° F., preferably about 500 to 750° F. The other reaction conditions generally include pressures of about 300 to 5,000 p.s.i.g., preferably about 1,000 to 2,500 p.s.i.g.; space velocities (WHSV) of about 0.1 to 5, preferably about 0.2 to 1; and molecular hydrogen to oil ratios of about 1,000 to 10,000 s.c.f./b., preferably about 2,000 to 8,000 s.c.f./b.

The catalyst of the second hydrogenation operation of the present invention is, as mentioned, a platinum group metal-promoted catalyst. This catalyst is to be distinguished from the catalysts of the first hydrogenation in that it is normally not sulfur-resistant. The catalyst includes catalytically effective amounts of the platinum group metals of Group VIII, for instance, platinum, palladium, rhodium or iridium. The catalytic amount of metal on a suitable carrier such as alumina usually falls within the range of about 0.01 to 2 weight percent, preferably about 0.1 to 1 weight percent. The small amount of platinum group metal may be prsent in the metallic form or as a sulfide, oxide or other combined form. The metal may interact with other constituents of the catalyst but if during use the platinum group metal be present in metallic form, then it is preferred that it be so finely divided that it is not detectable by X-ray diffraction means, i.e., that it exists as crystallites of less than 50 A. size. Of the platinum groups metals, platinum is preferred. If desired the catalysts of the first and second hydrogenations can be prereduced prior to use by heating in the presence of hydrogen, generally at temperature of about 700 to 1,100° F.

Although various solid refractory type carriers known in the art may be utilized as a support for the platinum group metal the preferred support is composed predominantly of alumina of the activated or calcined type. The alumina base is usually the major component of the catalyst, generally constituting at least about 75 weight percent on the basis of the catalyst and preferably at least about 85 to 99.8 percent. The catalyst base is an activated or gamma family-alumina such as those derived by calcination of amorphous hydrous alumina, alumina monohydrate, alumina trihydrates or their mixtures. The catalyst base precursor most advantageously is a mixture predominating in, or containing a major proportion of, for instance about 65 to 95 weight percent, one or more of the alumina trihydrates, bayerite, nordstrandite or gibbsite, and about 5 to 35 weight percent of alumina monohydrate (boehmite), amorphous hydrous alumina or their mixture. The alumina base can contain small amounts of other solid oxides such as silica, magnesia, natural or activated clays (such as kaolinite, montmorillonite, halloysite, etc.), titania, zirconia, etc., or their mixtures. A similar support can also be used for the first stage hydrogenation catalyst.

Following either of the hydrogenation operations of the present invention the hydrogenated oils may be distilled or topped if desired to remove any hydrocracked or other light materials that may have been formed and to increase the flash point of the oil. Whether or not topping is desired will depend on the particular lubricating oil fraction being hydrogenated and the particular hydrogenation conditions employed. Thus, the amount of topped overhead that may be taken off in the topping or distillation step after the first hydrogenation operation may vary from about 0 to 50%, with 0 to 20% being preferred. Likewise, the amount of overhead taken off in the topping or distillation operation after the second hydrogenation may vary from 0 to 50%, with 0 to 20% being preferred.

Generally, the plasticizers of this invention are fully compatible with most thermoplastic, non-rubbery resins in a range varying from about 5 to 50 parts by weight of oil per 100 parts of resin although in many instances the amount of plasticizer may exceed this amount. Such resins include polyvinyl chloride, polyvinyl acetate, polyvinyl formate, ethyl cellulose, polystyrene, substituted polystyrene where the substituent is, for example, methyl, ethyl, n-butyl, t-butyl, chloro, methoxy, etc., polymethyl methacrylate, polybutyl methacrylate, etc. In general, such non-rubbery resins are distinguished from rubbery resins by glass transition temperatures $T_g$ which for non-rubbery resins are above room temperature, e.g., about 300° Kelvin. The secondary plasticizers of this invention can be used with such thermoplastic, non-rubbery resins in extrusions, films and sheeting to improve resistance to migration and reduce sensitivity of the primary plasticizer to extraction by certain solvents. The plasticizers may also be used as an aid in dispersing pigments in plastisols for colored films or for coatings, applied by spraying, brushing, spreading or dipping for decorative or protective purposes.

In addition to primary and secondary plasticizers, the resin compositions of the instant invention can contain numerous other components blended and processed to obtain desired characteristics. The various components used include an anti-oxidant, anti-ozonant, reinforcing filler, extending filler, pigment, softener, primary plasticizer, extruding agent, peptizer, and miscellaneous materials for impairing special properties. While generally no one composition contains all of these components, typical products are as follows:

INGREDIENTS (PARTS BY WEIGHT)

| | | | |
|---|---|---|---|
| Polyvinyl chloride | 100 | 100 | 100 |
| Dioctyl phthalate | 35 | 30 | 35 |
| Oil C (described below) | 15 | 12 | 15 |
| Anti-oxidant and/or stabilizer | 1 | 1 | 1 |
| Anti-ozonant | | | 1 |
| Filler and pigment | | 10 | |
| Other plasticizers and softeners | As required | | |

Filler and pigment materials which may be used for compounding purposes include calcium carbonate, clays, calcium silicate, magnesium carbonate, zinc oxide, titanium dioxide, lithopone, magnesium oxide, mica, scapstone, and coumarone-indene resins. Depending upon the desired use of the composition the total solid filler content often ranges from about 0 to 150 parts of filler per hundred parts by weight of resin.

Typical anti-oxidants include: 2,2'-methylbis (4-methyl)-6-tertiary-butylphenol, phenyl-alpha-naphthylamine, phenyl-beta-naphthylamine, isopropyl-meta-cresol, 4,4'-thiobis (6-tertiarybutyl-meta-cresol), p-phenylphenol, monobenzyl ether of hydroquinone, 2,6-ditertiarybutyl-4-methylphenol, and styrene-phenol reaction products.

In carrying out the preparation of the resin materials, the resin, together with the additional compounding substances being added, can be worked on a mill, which can be an ordinary open roll mill, or the Banbury mixer, until all the ingredients are well dispersed. The compounded mixture of resin and other materials can be subjected to further treatment after the mixing operation, and can be formed, extruded, molded, calendered, or otherwise processed.

Curing the resin materials can be carried out at temperatures ranging from 300 to 400° F. for a period of time, e.g., 3 to 12 minutes, sufficient to yield valuable materials having improved characteristics such as resistance to migration, reduced sensitivity of the primary plasticizer to extraction by certain solvents, etc. Optimum curing appears to be at the temperature range of 300 to 360° F. for a period of 3 to 5 minutes. Exact properties depend upon the specific compounding employed.

The preparation of a secondary plasticizer according to the process of this invention, is illustrated in detail by the following examples.

EXAMPLE I

A naphthenic base raw lube distillate obtained as a side stream by distillation of a naphthenic base Coastal crude was the feedstock for the example. Inspection tests on this feedstock (Oil A) are presented in Table I. This feedstock was hydrogenated over a sulfided nickel-molybdena on alumina catalyst containing about 5% Ni and 14% $MoO_3$ using the following process conditions:

Pressure, p.s.i.g. _____ 1500
Temperature, ° F. _____ 700
Space velocity, WHSV _____ 0.25
Hydrogen rate, s.c.f./b. _____ 1500

A 12% overhead portion was removed by distillation to yield a first stage bottoms fraction product. Physical tests on this material (Oil B) are presented in Table I.

The first stage bottoms fraction product was the feed to a second stage hydrogenation. This hydrogenation was performed using a 0.6% platinum on alumina catalyst under the process conditions listed below:

Pressure, p.s.i.g. _____ 1500
Temperature, ° F. _____ 550
Space velocity, WHSV _____ 0.25
Hydrogen rate, s.c.f./b. _____ 5000

A 5% overhead fraction was removed by distillation to yield a finished bottoms fraction product. Inspection tests on this material (Oil C) are also listed in Table I.

TABLE I.—FEEDSTOCK AND PRODUCT INSPECTION TESTS

| | Oil A, initial feedstock | Oil B, first stage product | Oil C, second stage product |
|---|---|---|---|
| Gravity, ° API | 18.2 | 22.6 | 24.1 |
| Flash, ° F | 420 | 370 | 400 |
| Viscosity, SUS at 100° F | 928 | 491 | 497 |
| Color, ASTM | L8.0 | L1.5 | L0.5 |
| Color, Saybolt | ¹16 | ¹16 | +19 |
| Loss on heating, D-972 22 hours at 225° F | 0.96 | 1.33 | 0.79 |
| Titanium dioxide stain test | Dark | Medium | None |
| Hydrocarbon type analysis: | | | |
| Aromatic carbons, percent | 22 | 9 | 0 |
| Paraffinic carbons, percent | 39 | 45 | 44 |
| Naphthenic carbons, percent | 39 | 46 | 56 |

¹ Below.

The desirable properties of this product are exemplified by low volatility as shown by the Loss on Heating of only 0.79%, excellent color as shown by the +19 Saybolt color and excellent light stability as shown by the Titanium Dioxide Stain Test result of "none."

This product was satisfactorily used as a secondary plasticizer in production of polyvinyl chloride film. Two examples of formulations used are shown below.

Example A

| Component | Parts by weight |
|---|---|
| Polyvinyl chloride | 100 |
| Triisooctyl trimellitate | 48.5 |
| Oil C | 16.5 |

Example B

| Component | Parts by weight |
|---|---|
| Polyvinyl chloride | 100 |
| Dioctyl phthalate | 52 |
| Oil C | 13 |

The raw plastic films were cured at temperatures ranging from 300 to 400° F. for periods of 3 to 12 minutes. Optimum curing conditions being at the temperature range of 340 to 360° F. and times of 3 to 5 minutes.

EXAMPLE II

Oil C of Example I can be satisfactorily compounded with polyvinyl chloride and the following primary plasticizers: dibutyl phthalate, tricresyl phosphate, dioctyl adipate, dioctyl sebacate and di-2-ethylhexyl azelate.

EXAMPLE III

Oil C is compounded as in Example I with one of the following resins being substituted for the polyvinyl chloride of Example I: ethyl cellulose, polyvinyl acetate, polystyrene, polyvinyl formate, polyvinyl acetate/vinyl chloride and nitrocellulose.

EXAMPLE IV

A plasticizer comparable with Oil C of Example I and having essentially the same properties is produced in accordance with the procedure of Example I substituting the following catalytic promoting metals for the nickel oxide-molybdena of Example I, one of: cobalt oxide-molybdena, nickel oxide-tungstate, nickel oxide-chromate and nickel sulfide and cobalt sulfide-molybdenum sulfide.

EXAMPLE V

A plasticizer having the properties of Oil C is prepared in accordance with the procedure of Example I substituting for the platinum catalyst one of: palladium and rhodium.

It is claimed:
1. A composition of matter consisting essentially of a thermoplastic, non-rubbery resin which contains a primary plasticizing agent in an amount compatible with the resin and a secondary plasticizer in an amount compatible with the resin produced by the process which comprises hydrogenating a petroleum naphthenic lubricating oil fraction by contact with molecular hydrogen and a sulfur-resistant hydrogenation catalyst at a temperature of about 400 to 800° F. and a pressure of about 300 to 5,000 p.s.i.g. to provide a hydrogenated oil and hydrogenating said hydrogenated oil by contact with molecular hydrogen in the presence of a platinum group metal hydrogenation catalyst at a temperature of about 400 to 800° F. and a pressure of about 300 to 5,000 p.s.i.g., to provide a product having an aromatic content of less than about 3%.

2. The composition of claim 1 in which the plastic resin is polyvinyl chloride.

3. The composition of claim 1 in which the plastic resin is ethyl cellulose.

4. The composition of claim 1 in which the petroleum lubricating oil fraction is derived from a naphthenic crude selected from the class consisting of Gulf Coast and California crudes.

5. The composition of claim 1 in which the petroleum lubricating oil fraction has an SUS viscosity at 100° F. of about 75 to 1,200 seconds.

6. The composition of claim 1 wherein the hydrogenation catalyst in the first hydrogenation is selected from the group consisting of nickel oxide-molybdena and cobalt oxide-molybdena supported on alumina and the catalyst in the second hydrogenation is platinum on alumina.

7. The composition of claim 1 wherein the resin has a glass transition temperature of above 300° K.

8. The composition of claim 1 wherein the plasticizing agent is present in a range of about 5 to 50 parts by weight per 100 parts of resin.

9. The composition of claim 7 wherein the plasticizing agent is present in a range of about 5 to 50 parts by weight per 100 parts of resin.

10. A composition of matter consisting essentially of a thermoplastic non-rubbery resin, a primary plasticizer in an amount compatible with the resin and a secondary plasticizer in an amount compatible with the resin, the secondary plasticizer being the product of the process which comprises hydrogenating a petroleum naphthenic lubricating oil fraction containing about 10 to 25% aromatics and less than about 65% paraffins by contact with molecular hydrogen and a sulfur-resistant hydrogenation catalyst at a temperature of about 400 to 800° F. and a pressure of about 300 to 5,000 p.s.i.g. to provide a hydrogenated oil and hydrogenating said hydrogenated oil by contact with molecular hydrogen in the presence of a platinum group metal hydrogenation catalyst at a temperature of about 400 to 800° F. and a pressure of about 300 to 5,000 p.s.i.g., to provide a product having an aromatic content of less than about 3%.

11. The composition of claim 10 wherein the resin has a glass transition temperature of above 300° K.

12. The composition of claim 11 wherein the secondary plasticizer is present in a range of about 5 to 50 parts by weight per 100 parts of resin.

13. The composition of claim 12 wherein the primary plasticizer is present in an amount of up to about 150 parts by weight per 100 parts of resin.

14. The composition of claim 13 in which the petroleum lubricating oil fraction is derived from a naphthenic crude selected from the class consisting of Gulf Coast and California crudes.

15. The composition of claim 14 wherein the hydrogenation catalyst in the first hydrogenation is selected from the group consisting of nickel oxide-molybdena and cobalt oxide-molybdena supported on alumina and the catalyst in the second hydrogenation is platinum on alumina.

References Cited

UNITED STATES PATENTS

| | | | |
|---|---|---|---|
| 2,364,719 | 12/1944 | Jenkins | 260—33.6 |
| 2,834,746 | 5/1958 | Salyer | 260—33.6 |
| 2,945,833 | 7/1960 | Hoel | 260—33.6 |
| 2,490,148 | 12/1949 | Moeller | 106—191 |
| 2,549,101 | 4/1951 | Koch | 260—33.6 |
| 2,108,250 | 2/1938 | Carmody | 106—191 |
| 2,520,992 | 9/1950 | Axelrod | 260—33.6 |

JULIUS FROME, *Primary Examiner.*

U.S. Cl. X.R.

260—33.6, 31.8, 41, 23.3